United States Patent
Muldoon

(10) Patent No.: US 11,952,946 B2
(45) Date of Patent: Apr. 9, 2024

(54) TURBINE ENGINE WITH PREHEAT OF CRYOGENIC FUEL VIA INTERMEDIATE FLUID

(71) Applicant: Raytheon Technologies Corporation, Farmington, CT (US)

(72) Inventor: Marc J. Muldoon, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/965,662

(22) Filed: Oct. 13, 2022

(65) Prior Publication Data
US 2023/0258131 A1 Aug. 17, 2023

Related U.S. Application Data

(60) Provisional application No. 63/256,140, filed on Oct. 15, 2021.

(51) Int. Cl.
*F02C 7/224* (2006.01)
*F02C 7/12* (2006.01)

(52) U.S. Cl.
CPC ............... *F02C 7/224* (2013.01); *F02C 7/12* (2013.01)

(58) Field of Classification Search
CPC .... F23R 3/005; F02C 1/04; F02C 6/18; F02C 7/224; F02C 7/12; F02C 7/08; F02C 7/10; F02C 7/14; F02C 7/16; F02C 7/18; F02C 7/185; F28D 2021/0033; F28D 2021/0047; F28D 7/106; F28D 7/10; F28D 15/00
See application file for complete search history.

(56) References Cited

U.S. PATENT DOCUMENTS

| | | | |
|---|---|---|---|
| 2,090,345 A | 8/1937 | Coy | |
| 3,237,400 A * | 3/1966 | Kuhrt | F02C 7/224 60/260 |
| 3,690,100 A * | 9/1972 | Wolf | F02C 7/08 60/206 |
| 5,048,597 A | 9/1991 | Bond | |

(Continued)

FOREIGN PATENT DOCUMENTS

| | | | | |
|---|---|---|---|---|
| EP | 4001618 A2 * | 5/2022 | ............ | C01B 3/047 |
| WO | WO-2015050601 A2 * | 4/2015 | ............ | B64D 37/34 |

OTHER PUBLICATIONS

European Search Report dated Mar. 17, 2023 for European Patent Application No. 22201588.5.

*Primary Examiner* — Craig Kim
(74) *Attorney, Agent, or Firm* — Bachman & LaPointe, P.C.

(57) ABSTRACT

A turbine engine has: a compressor; a combustor; a turbine; a gaspath passing downstream from the compressor through the combustor and then through the turbine; a fuel source; a fuel flowpath from the fuel source to the combustor; and a heat exchanger for transferring heat from the gaspath to the fuel flowpath The heat exchanger has: an inner wall in heat transfer relation with the gaspath; an outer wall; tubes between the inner wall and the outer wall bounding respective segments of the fuel flowpath; and a heat transfer fluid between the inner wall and the outer wall and in heat transfer relation with the tubes and the inner wall.

24 Claims, 12 Drawing Sheets

(56) References Cited

U.S. PATENT DOCUMENTS

| | | | | |
|---|---|---|---|---|
| 5,052,176 A * | 10/1991 | Labatut | ............... | F23R 3/20 60/761 |
| 5,832,718 A * | 11/1998 | Suttrop | ............... | F02C 7/224 60/39.465 |
| 6,263,678 B1 * | 7/2001 | Suttrop | ............... | F17C 13/10 165/104.11 |
| 8,671,694 B2 * | 3/2014 | Thacker | ............... | F02C 6/18 60/782 |
| 9,027,322 B2 * | 5/2015 | Gulko | ............... | F25J 3/04545 60/39.461 |
| 9,222,415 B2 | 12/2015 | Osorio | | |
| 9,695,750 B2 | 7/2017 | Wollenweber | | |
| 9,765,691 B2 | 9/2017 | Delgado et al. | | |
| 10,830,150 B2 * | 11/2020 | Snyder | ............... | F02C 3/04 |
| 10,989,117 B2 * | 4/2021 | Roberge | ............... | F02C 3/22 |
| 11,499,474 B2 * | 11/2022 | Michalik | ............... | F01K 3/181 |
| 11,555,450 B1 * | 1/2023 | Ryon | ............... | F02C 7/141 |
| 11,661,889 B1 * | 5/2023 | Muldoon | ............... | F02C 7/224 415/116 |
| 11,686,250 B2 * | 6/2023 | Kraft | ............... | F02C 7/22 60/776 |
| 2006/0185347 A1 * | 8/2006 | Knapp | ............... | F01C 13/04 60/269 |
| 2013/0219915 A1 * | 8/2013 | Prociw | ............... | F01D 25/14 165/154 |
| 2014/0369897 A1 * | 12/2014 | Verykios | ............... | B01J 8/025 422/162 |
| 2015/0252727 A1 * | 9/2015 | Aoki | ............... | B64D 37/34 165/51 |
| 2016/0003551 A1 * | 1/2016 | Fujita | ............... | F28F 9/22 165/162 |
| 2016/0061530 A1 * | 3/2016 | Hikichi | ............... | F28F 27/00 165/104.21 |
| 2016/0290290 A1 * | 10/2016 | Lo | ............... | F23R 3/28 |
| 2017/0254269 A1 * | 9/2017 | Snyder | ............... | F02C 7/224 |
| 2017/0292412 A1 * | 10/2017 | Fonseca | ............... | F01D 15/005 |
| 2018/0363555 A1 * | 12/2018 | Zelina | ............... | F02C 3/145 |
| 2019/0153952 A1 * | 5/2019 | Niergarth | ............... | F02C 7/14 |
| 2020/0025379 A1 * | 1/2020 | Jones | ............... | F23R 3/06 |
| 2020/0165974 A1 * | 5/2020 | Smith | ............... | F02C 7/18 |
| 2020/0332715 A1 * | 10/2020 | Ribarov | ............... | F02C 7/14 |
| 2021/0102492 A1 * | 4/2021 | Rambo | ............... | F02C 3/22 |
| 2021/0207537 A1 | 7/2021 | Roberge | | |
| 2021/0300575 A1 | 9/2021 | Staubach et al. | | |
| 2022/0252012 A1 * | 8/2022 | Verrilli | ............... | F02K 7/10 |
| 2022/0252257 A1 * | 8/2022 | Kameyama | ............... | F23D 11/36 |
| 2022/0290609 A1 * | 9/2022 | Davis | ............... | F23R 3/283 |
| 2023/0022291 A1 * | 1/2023 | Carretero Benignos | ............... | B64D 29/06 |
| 2023/0130173 A1 * | 4/2023 | Versailles | ............... | F23R 3/14 60/737 |
| 2023/0167770 A1 * | 6/2023 | Carretero Benignos | ............... | B64D 27/12 60/39.091 |

* cited by examiner

TURBINE ENGINE WITH PREHEAT OF CRYOGENIC FUEL VIA INTERMEDIATE FLUID

CROSS-REFERENCE TO RELATED APPLICATION

Benefit is claimed of U.S. Patent Application No. 63/256,140, filed Oct. 15, 2021, and entitled "Turbine Engine with Preheat of Cryogenic Fuel via Intermediate Fluid", the disclosure of which is incorporated by reference herein in its entirety as if set forth at length.

BACKGROUND

The disclosure relates to gas turbine engines. More particularly, the disclosure relates to hydrogen-fueled gas turbine engines.

Gas turbine engines (used in propulsion and power applications and broadly inclusive of turbojets, turboprops, turbofans, turboshafts, industrial gas turbines, and the like) are being considered for use with cryogenic fuel, in particular hydrogen fuel. For example, US Patent Application Publication 20210207537A1 identifies various cryogenic fuels including hydrogen.

Cryogenic fuels must be heated, but in a controlled manner. The natural choice is to heat with the gaspath, but temperatures/temperature differentials are high and can lead to uncontrolled heating of the fuel. The use of an intermediary fluid, intervening between the gaspath and the fuel may limit the effects of the differences.

SUMMARY

One aspect of the disclosure involves a turbine engine comprising: a compressor; a combustor; a turbine; a gaspath passing downstream from the compressor through the combustor and then through the turbine; a fuel source; a fuel flowpath from the fuel source to the combustor; and a heat exchanger for transferring heat from the gaspath to the fuel flowpath. The heat exchanger comprises: an inner wall in heat transfer relation with the gaspath; an outer wall; tubes between the inner wall and the outer wall bounding respective segments of the fuel flowpath; and a heat transfer fluid between the inner wall and the outer wall and in heat transfer relation with the tubes and the inner wall.

In a further embodiment of any of the foregoing embodiments, additionally and/or alternatively, the fuel comprises at least 90% hydrogen by weight and the heat transfer fluid comprises at least 90% nitrogen by weight.

In a further embodiment of any of the foregoing embodiments, additionally and/or alternatively, the turbine engine further comprises: a heat transfer fluid flowpath for the heat transfer fluid passing downstream through the heat exchanger and being a recirculating flowpath; a pump along the heat transfer fluid flowpath for pumping the heat transfer fluid; and a pressure sensor along the heat transfer fluid flowpath.

In a further embodiment of any of the foregoing embodiments, additionally and/or alternatively, the turbine engine further comprises: an accumulator vessel; and a branch off the heat transfer fluid flowpath, the branch extending to the accumulator vessel.

In a further embodiment of any of the foregoing embodiments, additionally and/or alternatively, the heat exchanger comprises a plurality of sectors. The turbine engine includes: means for independently controlling flow of the fuel through each of the sectors; and/or means for independently controlling flow of the heat transfer fluid through each of the sectors.

In a further embodiment of any of the foregoing embodiments, additionally and/or alternatively, the heat exchanger has: a first axial end mated to a turbine exhaust case; and a second axial end mated to a nozzle.

In a further embodiment of any of the foregoing embodiments, additionally and/or alternatively, the inner wall comprises a nickel-based alloy and the outer wall comprises stainless steel.

In a further embodiment of any of the foregoing embodiments, additionally and/or alternatively, the heat exchanger comprises: a fuel inlet manifold; a fuel outlet manifold; and said tubes bounding respective segments of the fuel flowpath between the fuel inlet manifold and the fuel outlet manifold.

In a further embodiment of any of the foregoing embodiments, additionally and/or alternatively, the heat exchanger inner wall comprises: a first plurality of fins protruding into the gaspath and a second plurality of fins protruding into the heat transfer fluid.

In a further embodiment of any of the foregoing embodiments, additionally and/or alternatively, the heat exchanger comprises means for accommodating differential thermal expansion of the inner wall relative to the outer wall.

In a further embodiment of any of the foregoing embodiments, additionally and/or alternatively, the inlet manifold, the outlet manifold, the inner wall, and the outer wall are secured to each other near a first axial end of the heat exchanger with the tubes extending toward an opposite second axial end.

In a further embodiment of any of the foregoing embodiments, additionally and/or alternatively, the means for accommodating differential thermal expansion of the inner wall relative to the outer wall comprises a diaphragm on the outer wall.

In a further embodiment of any of the foregoing embodiments, additionally and/or alternatively, the means for accommodating differential thermal expansion of the inner wall relative to the outer wall comprises a sliding seal.

In a further embodiment of any of the foregoing embodiments, additionally and/or alternatively, the heat exchanger comprises means for accommodating differential thermal expansion of the inner wall relative to the tubes.

In a further embodiment of any of the foregoing embodiments, additionally and/or alternatively, the means for accommodating differential thermal expansion of the inner wall relative to the tubes comprises a plurality of carbon blocks in sliding engagement with at least one of the inner wall and the tubes.

In a further embodiment of any of the foregoing embodiments, additionally and/or alternatively, a method for operating the turbine engine comprises: passing fuel along the fuel flowpath from the fuel source to the combustor; combusting the passed fuel in the combustor to generate combustion gas; and transferring heat from the combustion gas to the fuel via the heat transfer fluid prior to the passing of the fuel to the combustor to heat the fuel.

In a further embodiment of any of the foregoing embodiments, additionally and/or alternatively, the method further comprises: measuring a pressure of the heat transfer fluid; and responsive to a decrease in the measured pressure of the heat transfer fluid, shutting down the turbine engine and/or shutting off at least portion of the passing fuel.

In a further embodiment of any of the foregoing embodiments, additionally and/or alternatively, the method further comprises: responsive to an increase in pressure of the heat transfer fluid, venting heat transfer fluid to an accumulator.

In a further embodiment of any of the foregoing embodiments, additionally and/or alternatively, the passed fuel enters the heat exchanger at a temperature of −260° C. to −230° C. The method further comprises: measuring a temperature of the fuel; and responsive to the measured temperature of the fuel controlling a pump pumping the heat transfer fluid so as to maintain the passed fuel leaving the heat exchanger at a temperature of −90° C. to −65° C.

A further aspect of the disclosure involves, a turbine engine comprising: a compressor; a combustor; a turbine; a gaspath passing downstream from the compressor through the combustor and then through the turbine; a fuel source; a fuel flowpath from the fuel source to the combustor; and a heat exchanger for transferring heat from the gaspath to the fuel flowpath, wherein the heat exchanger comprises: a first surface in thermal communication with the gaspath; a second surface in thermal communication with the fuel flowpath; and a heat transfer fluid between the first surface and the second surface, the heat transfer fluid comprising at least 90% nitrogen by weight.

A further aspect of the disclosure involves, a turbine engine comprising: a compressor; a combustor; a turbine; a gaspath passing downstream from the compressor through the combustor and then through the turbine; a fuel source; a fuel flowpath from the fuel source to the combustor; and a heat transfer fluid flowpath carrying heat transfer fluid for transferring heat from the gaspath to the fuel flowpath, the heat transfer fluid comprising at least 90% nitrogen by weight.

In a further embodiment of any of the foregoing embodiments, additionally and/or alternatively, the turbine engine further comprises: a heat exchanger comprising: an inner wall separating the gaspath from the heat transfer fluid flowpath; an outer wall; a fuel inlet manifold; a fuel outlet manifold; tubes bounding respective segments of the fuel flowpath between the fuel inlet manifold and the fuel outlet manifold; and means for accommodating differential thermal expansion of the inner wall relative to the outer wall; and means for accommodating differential thermal expansion of the inner wall relative to the tubes.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 10:
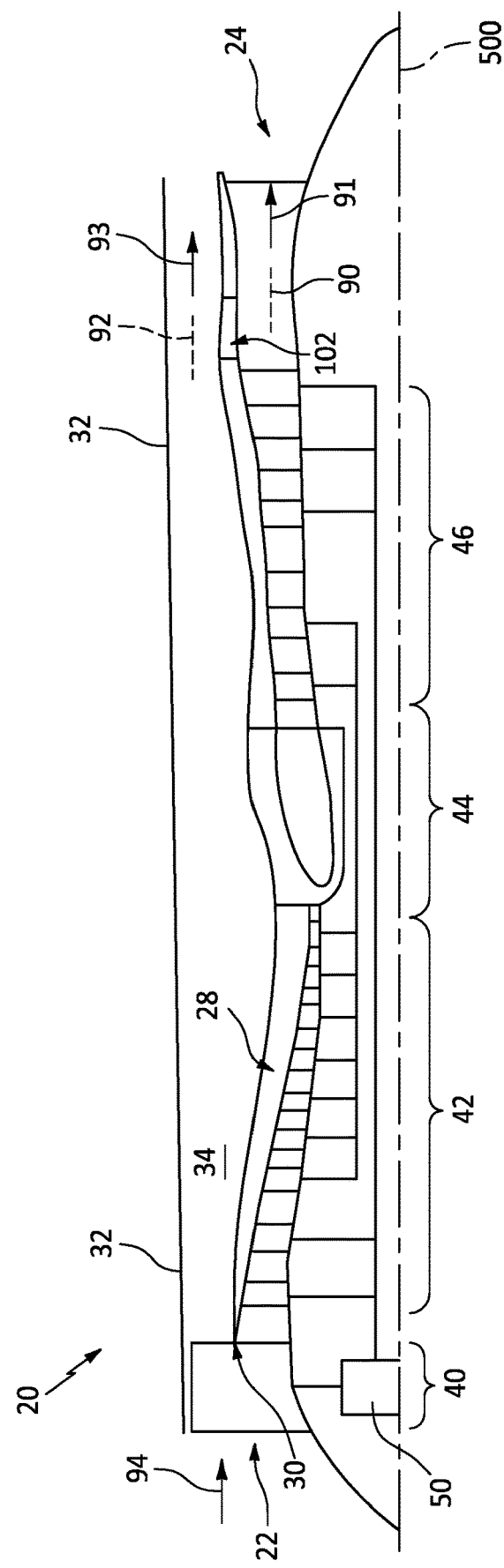
FIG. 10 is a schematic sectional half view of a gas turbine engine including the fuel system.

FIG. 10 shows a gas turbine engine 20. As is discussed below, the engine is illustrated as a schematic modification of a baseline existing engine. It may be a baseline engine designed for cryogenic hydrogen fuel or a baseline engine designed for conventional liquid jet fuel further modified for use with cryogenic hydrogen fuel. FIG. 10 schematically shows the example gas turbine engine 20 as a turbofan engine having a centerline or central longitudinal axis 500 and extending from an upstream end at an inlet 22 to a downstream end at an outlet 24. The example engine schematically includes a core flowpath or gaspath 90 passing a core flow 91 and a bypass flowpath 92 passing a bypass flow 93. The core flow and bypass flow are initially formed by respective portions of a combined inlet airflow 94 divided at a splitter 30. Thus, the example core flow starts out as air and downstream of the combustor comprises combustion products as combustion gas.

A core case (inner diameter (ID) case) or other structure 28 divides the core flowpath from the bypass flowpath. The bypass flowpath is, in turn, surrounded by an outer case (outer diameter (OD) case) 32 which, depending upon implementation, may be a fan case. A bypass duct 34 is configured radially between the ID case and OD case. From upstream to downstream, the engine includes a fan section 40 having one or more fan blade stages, a compressor 42 having one or more sections each having one or more blade stages, a combustor 44 (e.g., annular, can type, or reverse flow), and a turbine 46 again having one or more sections each having one or more blade stages. For example, many so called two-spool engines have two compressor sections and two turbine sections with each turbine section driving a respective associated compressor section and a lower pressure downstream turbine section also driving the fan (optionally via a gear reduction 50). Yet other arrangements are possible.

Various illustrated and non-illustrated features of the engine may be otherwise conventional including basic control hardware, programming, and use and manufacture methods. The control hardware shown and discussed may be implemented merely via additional programming of and connections to baseline control hardware at engine level or aircraft/vehicle level (e.g., the full authority digital engine control (FADEC)) or may be further implemented with additional control components such as additional microcontrollers or the like.

Figure 1:
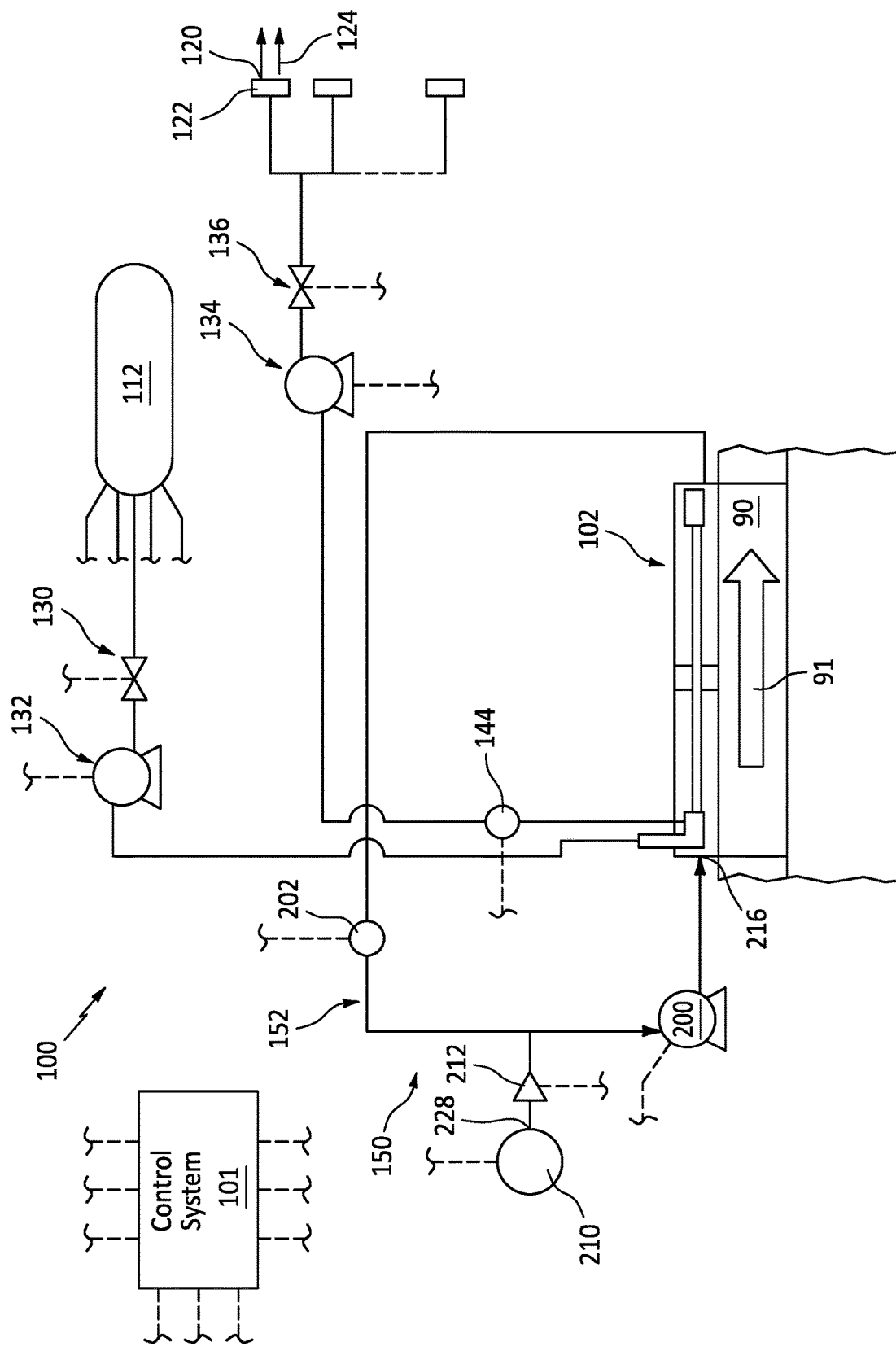
FIG. 1 is a schematic view of a fuel system for a cryogenic fuel gas turbine engine.

FIG. 1 is a schematic view of a fuel system 100 including a fuel preheat heat exchanger 102. One or more fuel flowpaths 110 start at one or more fuel vessels 112. An example of fuel vessels are tanks, such as insulated metallic or composite overwrapped pressure vessels (COPV). These vessels may contain fuel at cryogenic conditions of ambient or near ambient pressure and −259° C. to −252° C. temperature (more narrowly −255° C. to −252° C.). These storage conditions may be maintained by insulation and pressure relief valve(s) allowing for off-gassing.

The fuel flowpath(s) 110 extend to outlets 120 (fuel discharge outlets) in the engine combustor(s) (e.g., to outlets 120 in one or more fuel nozzles 122 discharging fuel streams 124). As such, the fuel flowpaths may have multiple branches at least to the nozzles. But, however, as discussed below, there are or may be multiple further branches upstream which may subsequently converge fully or partially.

For efficient combustion, the cryogenic fuel should be preheated to a supercritical state. For example, it may be heated from a temperature of −253° C. to −240° C. (more broadly −260° C. to −230° C.) to a temperature of −80° C. to −60° C. (more broadly −100° C. to −50° C.) while maintaining a pressure of 1700 kPa to 1750 kPa pressure (more broadly 1600 kPa to 1800 kPa).

To preheat the fuel, the engine includes the heat exchanger 102 for transferring heat from the gaspath 90 to the fuel flowpath(s) 110 (from combustion gas 91 flowing along/through the gaspath to fuel 111 flowing along/through the fuel flowpath(s)). The example heat exchanger 102 is positioned axially/streamwise downstream/aft of the turbine section(s) and upstream/forward of an exhaust nozzle. As is discussed further below, the heat exchanger 102 utilizes an intermediate/intermediary fluid (heat transfer fluid) intervening between the combustion gas and the fuel.

In a multi-engine aircraft, there may be separate fuel flowpath(s) 110 for each engine. For example, as discussed below, there may be multiple fuel flowpaths for a given engine, allowing shut-off of flow along each flowpath individually, such as in case of a leak.

FIG. 1 schematically shows a control system or controller 101. Various control and/or power and/or data lines are shown as broken lines extending to controlled components, sensors, and the like. These lines may represent digital communication (wires, fiber, or radio frequency (RF)) or electrical/power (e.g., wires). Although a single box is schematically shown, multiple components in distributed locations may be used.

FIG. 1. further shows a shutoff valve 130 and a low pressure pump 132 in a fuel flowpath 110 upstream of the heat exchanger 102. Example valves 130 are solenoid valves. Example pumps 132 are centrifugal pumps. FIG. 1. further shows a high pressure pump 134 and pressure regulating valve 136 in that fuel flowpath 110 downstream of the heat exchanger 102. Example valves 136 are solenoid valves. Example pumps 134 are centrifugal pumps. In an example of a wing pylon-mounted engine, the vessel(s) 112, valve(s) 130, and pump(s) 132 may be located inside the airframe/fuselage and the pump(s) 134 and valve(s) 136 may be in/on the engine.

Figure 2:
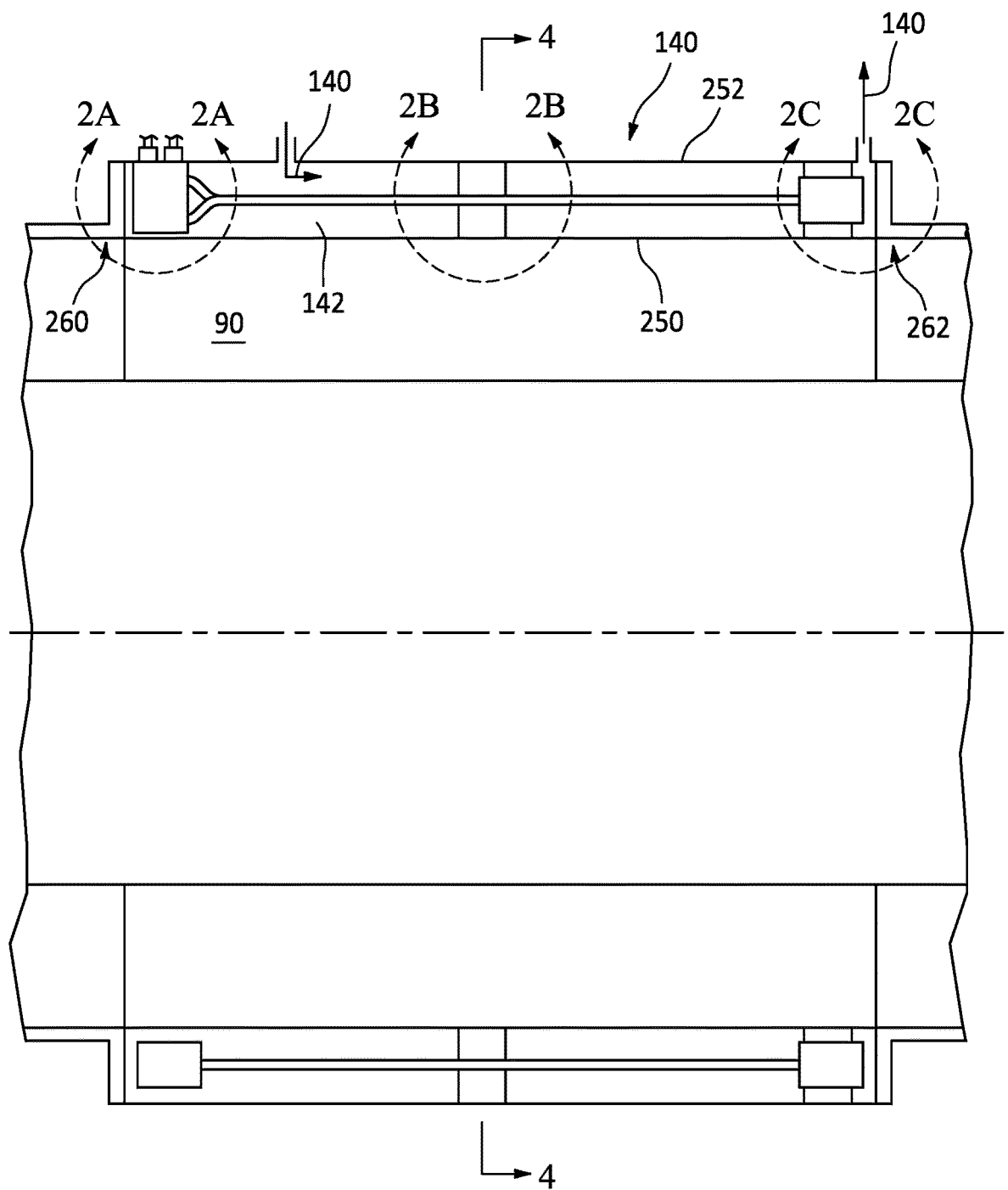
FIG. 2 is a schematic central longitudinal sectional view of a fuel preheat heat exchanger of the fuel system illustrated in FIG. 1.

FIG. 2 shows a flow 140 of the heat transfer fluid entering a chamber 142 of the heat exchanger. The fuel flowpath 110 passes in branches through tubes (discussed below) in the heat exchanger chamber 142. Discussed below, an example heat transfer fluid is nitrogen ($N_2$). It may be commercially pure nitrogen or at least substantially more pure and oxygen-free than air (e.g., at least 90 percent nitrogen by weight or at least 95% or at least 99% with an example at most 10% or at most 5% or at most 1% or at most 0.5% oxygen or combustible gases by weight). The nitrogen in the heat transfer loop may be maintained in a pressurized state or, at higher pressures specifically a supercritical state. For example, at above about 5000 kPa and temperature over about 80° C. it may be supercritical. Thus example nitrogen pressures maintained in the heat transfer fluid loop may be in the range of 3000 kPa to 11,000 kPa including supercritical examples at the higher end.

The heat transfer fluid is heated by the combustion gas in the gaspath 90 and, in turn, heats the fuel in the tubes. FIG. 1 shows a fuel temperature sensor 144 (e.g., thermocouple) along the fuel flowpath 110 positioned to measure the temperature of fuel exiting or downstream of the heat exchanger 102. This may essentially represent the temperature of fuel entering the fuel nozzles 122 for combustion.

Figure 2A:
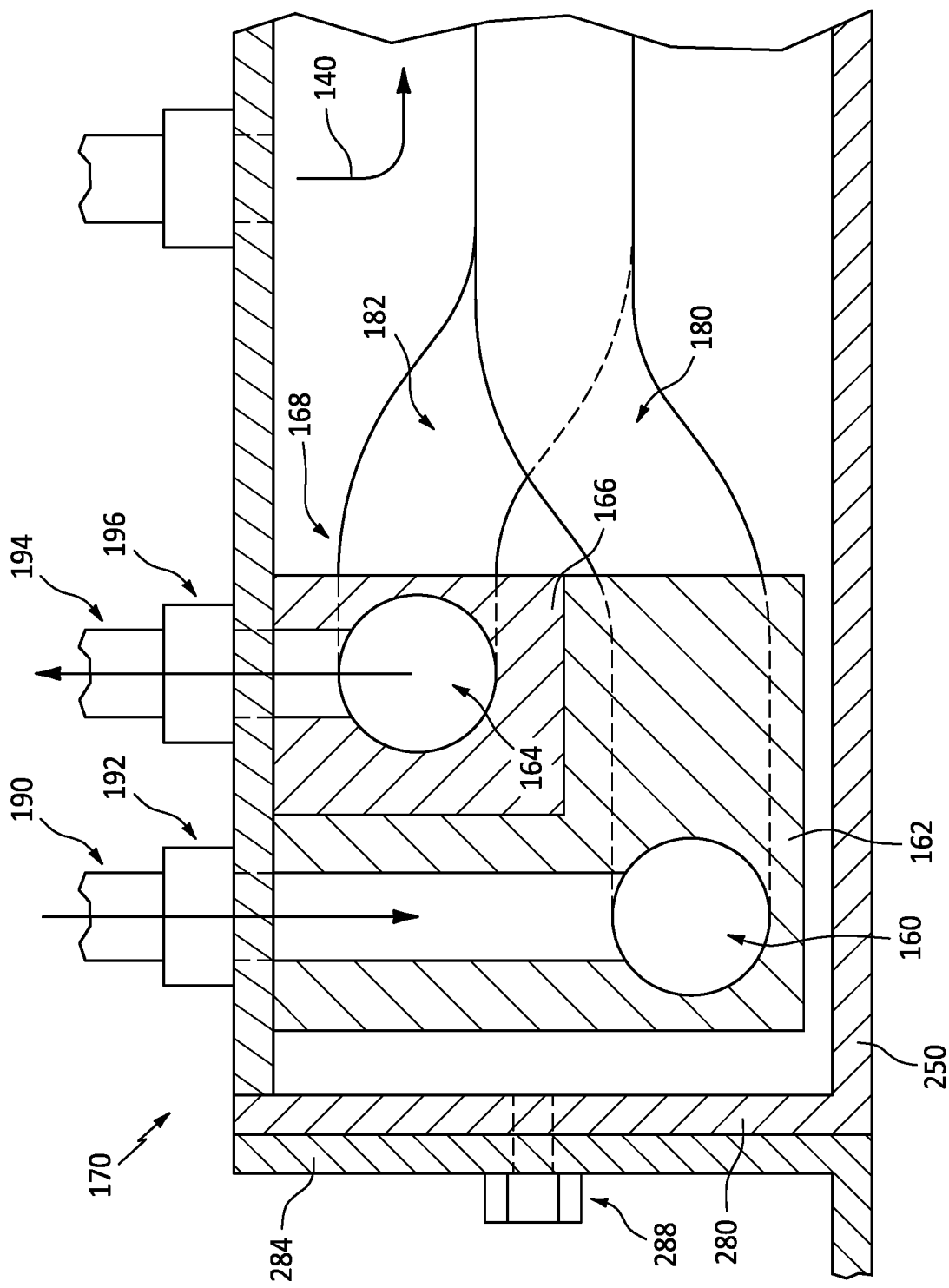
FIG. 2A is an enlarged view of a forward end of the heat exchanger illustrated in FIG. 2.

The heat transfer fluid passes as a recirculating flow along a heat transfer fluid flowpath 150 (FIG. 1) shown comprising or consisting of a loop 152. The loop passes through the heat exchanger 102. More particularly, the loop passes through the chamber 142 of the heat exchanger 102. A plurality of branches of the fuel flowpath 110 pass within the chamber. For example, the plurality of tubes may pass within the chamber carrying the fuel. The heat transfer fluid in the chamber 142 may surround the tubes within the chamber. Thus, in this example, the fuel flowpath 110 branches out in a fuel inlet plenum 160 (FIG. 2A) of a fuel inlet manifold 162 of the heat exchanger 102 and the branches converge in a fuel outlet plenum 164 of a fuel outlet manifold 166. The example fuel inlet manifold and fuel outlet manifold are part of a single combined manifold structure 168 at one axial end 170 of the heat exchanger. A return manifold 172 (FIG. 2C) and its plenum 174 are located at the opposite axial end 176. A plurality of first tubes (or tube legs) 180 (FIG. 2A) thus convey fuel from the fuel inlet manifold/plenum to the return manifold and a plurality of second tubes (or tube legs) 182 thus convey fuel from the return manifold back to the fuel outlet manifold/plenum.

In this example, the combined manifold 168 and return manifold 172 are each annular structures (or may be annular segments (segments of an annulus)). Such annular segments may be used in the case of a fully segmented heat exchanger (e.g., where the chamber 142 is a segment bounded by circumferential end walls so that both the fuel flow and heat exchange fluid flow may be independently controlled for each segment). Or, such annular segments may be used in a situation of a full annulus chamber 142 (e.g., where fuel flow is independently controllable over a sector or segment while heat transfer fluid flow is not).

The example heat exchanger has tubes at only a single radial position (a single radial stage) over a majority of their lengths with first tubes 180 circumferentially alternating with second tubes 182. However, other configurations including multiple radial stages are possible. Additionally, whereas the return manifold 172 may contain a plenum 174 shared by all its associated tubes 180 and 182, alternative manifold structures may have single passageways for each adjacent pair of a first tube 180 and a second tube 182. Additionally, to take the place of a return manifold and separate first and second tubes, tubes may be bent to have first and second legs and a turn, with the turn replacing the return manifold 172.

In the example combined manifold 168, to avoid fuel inlet plenum 160 and fuel outlet plenum 162 interfering, one may be radially shifted relative to the other. For example, the illustrated fuel inlet plenum 160 is shifted radially inward and the fuel outlet plenum 164 is shifted radially outward in FIG. 2A. Thus, end portions of the tubes 180, 182 mating with the combined manifold are bent to provide the shift/offset. Also, in the example, the heat exchanger or sector or segment has a single fuel inlet conduit 190 extending to the fuel inlet plenum 160 (e.g., to a fitting 192 on the fuel inlet manifold forming a fuel inlet of the heat exchanger) and a single fuel outlet conduit 194 extending from the fuel outlet plenum (e.g., from a fitting 196 on the fuel outlet manifold forming a fuel outlet of the heat exchanger).

As noted above, the heat transfer fluid flowpath 150 (FIG. 1) comprises a recirculating loop 152. Along the loop, are a pump 200 for pumping the heat transfer fluid and a pressure sensor 202 (discussed further below) for measuring pressure in the loop. An example pump 200 is a gear pump. An example pressure sensor 202 is pressure transducer such as a remote electrical pressure transducer. Example heat transfer fluid pressure in the loop 152 is about 4000 kPa, more broadly 3000 kPa to 5000 kPa. Example heat transfer fluid temperature entering the heat exchanger is about 150° C., more broadly 100° C. to 200° C. Example heat transfer fluid temperature leaving the heat exchanger is about 230° C., more broadly 200° C. to 300° C. An example temperature increase of the heat transfer fluid across the heat exchanger is about 80° C., more broadly 50° C. to 200° C. Within the heat exchanger, the heat transfer fluid has greater thermal gradients between portions of the heat transfer fluid adjacent the inner wall and portions adjacent the tubes.

The engine further includes a heat transfer fluid reservoir 210 coupled to the loop 202 via a regulating valve 212. Depending upon implementation, if present, the reservoir 210 may act as a supply reservoir to add heat transfer fluid to the loop and/or an accumulator or storage reservoir to receive heat transfer fluid from the loop. An example reservoir 210 is a piston-type reservoir or a bladder-type reservoir. In such reservoirs, a pressurant gas (e.g., nitrogen) is isolated from the pressurized fluid (e.g., the pressurant gas is on the opposite side of the piston from the pressurized fluid or is inside the bladder or on an opposite side of the bladder or membrane). Additional means may be provided for maintaining pressure of the pressurant gas such as a pump or a compressor (not shown). An example, regulating valve 212 is a spring-biased pressure regulating valve or a controlled throttling or modulated valve.

Figure 8:
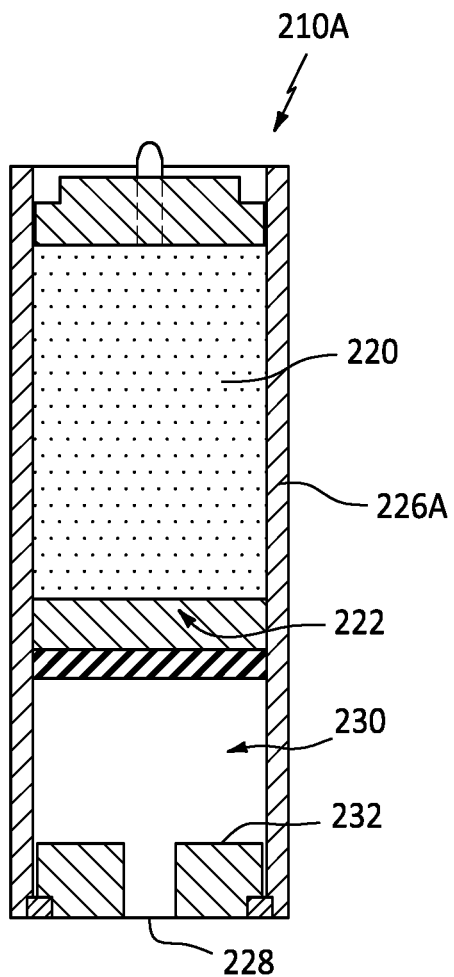
FIG. 8 is a schematic sectional view of a first accumulator for heat exchange fluid.
Figure 9:
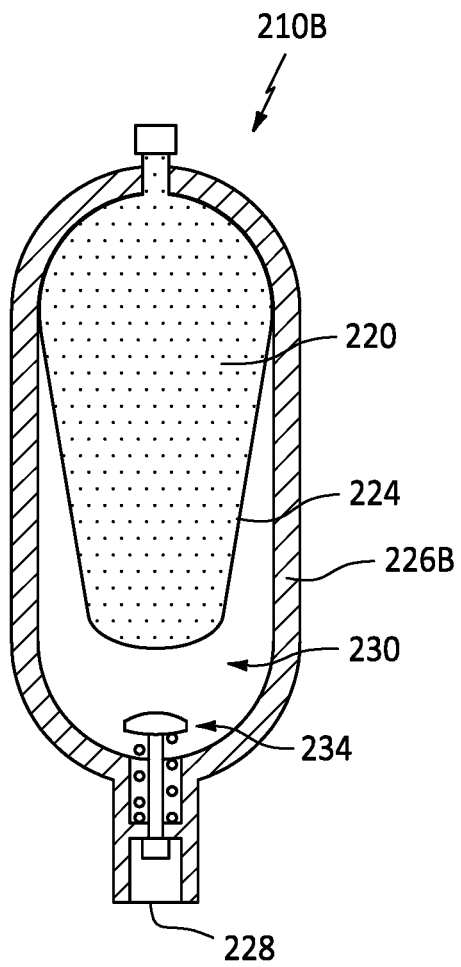
FIG. 9 is a schematic sectional view of a second accumulator for heat exchange fluid.

FIGS. 8 and 9 show the example accumulators as having a housing 226A, 226B with a port 228 and a volume 230 in communication with the heat transfer fluid flowpath for containing heat transfer fluid. The piston of the accumulator 210A has a range of motion between a maximally extended condition bottomed against a shoulder 232 in a range of compressed conditions. A maximally compressed condition may be determined by another shoulder (not shown) or by bottoming against an opposite end of the housing. Depending on implementation, as a practical matter, the piston 222 may never reach the maximally compressed condition due to pressure of the gas 220.

Similarly, the bladder-type accumulator 210B has a maximally expanded condition of the bladder 224 in which it presses against and closes the poppet valve 234 (which may serve in lieu of the valve 212). Again, the bladder may compress through a range of conditions to a maximally compressed condition which potentially may never be reached due to the properties of the pressurant gas 220.

In the example, the loop 152 proceeds in a downstream direction: from the heat transfer fluid pump 200 to a heat transfer fluid inlet 216 of the heat exchanger 102 and its chamber 142 (e.g., at the fitting 192); through the heat exchanger chamber to a heat transfer fluid outlet 218 (e.g., at the fitting 196) of the heat exchanger and its chamber; through or past the heat transfer fluid pressure sensor 202; and back to the heat transfer fluid pump 200. Outside of the heat exchanger and pump, the heat transfer fluid flowpath 150 may be generally defined and bounded by appropriate conduit (e.g., metallic piping) as may be conventional or yet-developed.

Contrasted with direct heat exchange from combustion gas to fuel, the heat transfer fluid may serve as a thermal buffer mitigating temperature spikes. As is discussed below, via control over flow in the heat transfer loop 152, the heat imparted to the fuel may be controlled to control fuel temperature.

The heat transfer fluid in the chamber 142 may also help contain the fuel in the event of a fuel leak. Depending on the nature of the heat transfer fluid, the heat transfer fluid may serve to inert leakage (e.g., if an actual inert gas such as argon or a relatively inert gas such as nitrogen or carbon dioxide (inert in that it does not react with the fuel)). Where the heat transfer fluid pressure is higher than that of the fuel, any breach of a tube, connection, etc. (e.g., due to thermal stresses) within the heat exchanger will vent heat transfer fluid into the fuel flowpath. This may be detected via a drop in pressure in the loop 152 measured by the pressure sensor 202. For example, the controller 101 (e.g., FADEC or other controller) may continuously monitor pressure from the sensor 202. Upon detection of a pressure drop (e.g., a threshold decrease over a threshold time), the controller may stop fuel flow through the associated heat exchanger chamber by shutting down the pumps 132 and 134 and closing the valves 130 and 136 to shut off fuel flow (e.g., through just a sector or as part of shutting down the entire engine).

Contrasted with a series loop (an intermediate fluid loop absorbing/receiving heat from the gaspath at a first heat exchanger and passing to a remote second heat exchanger to, in turn, reject heat to the fuel flowpath), the system 100 may save mechanical complexity and cost associated with having separate heat exchangers between the combustion gas and the heat transfer fluid on the one hand and between the heat transfer fluid and the fuel on the other hand.

Figure 4:
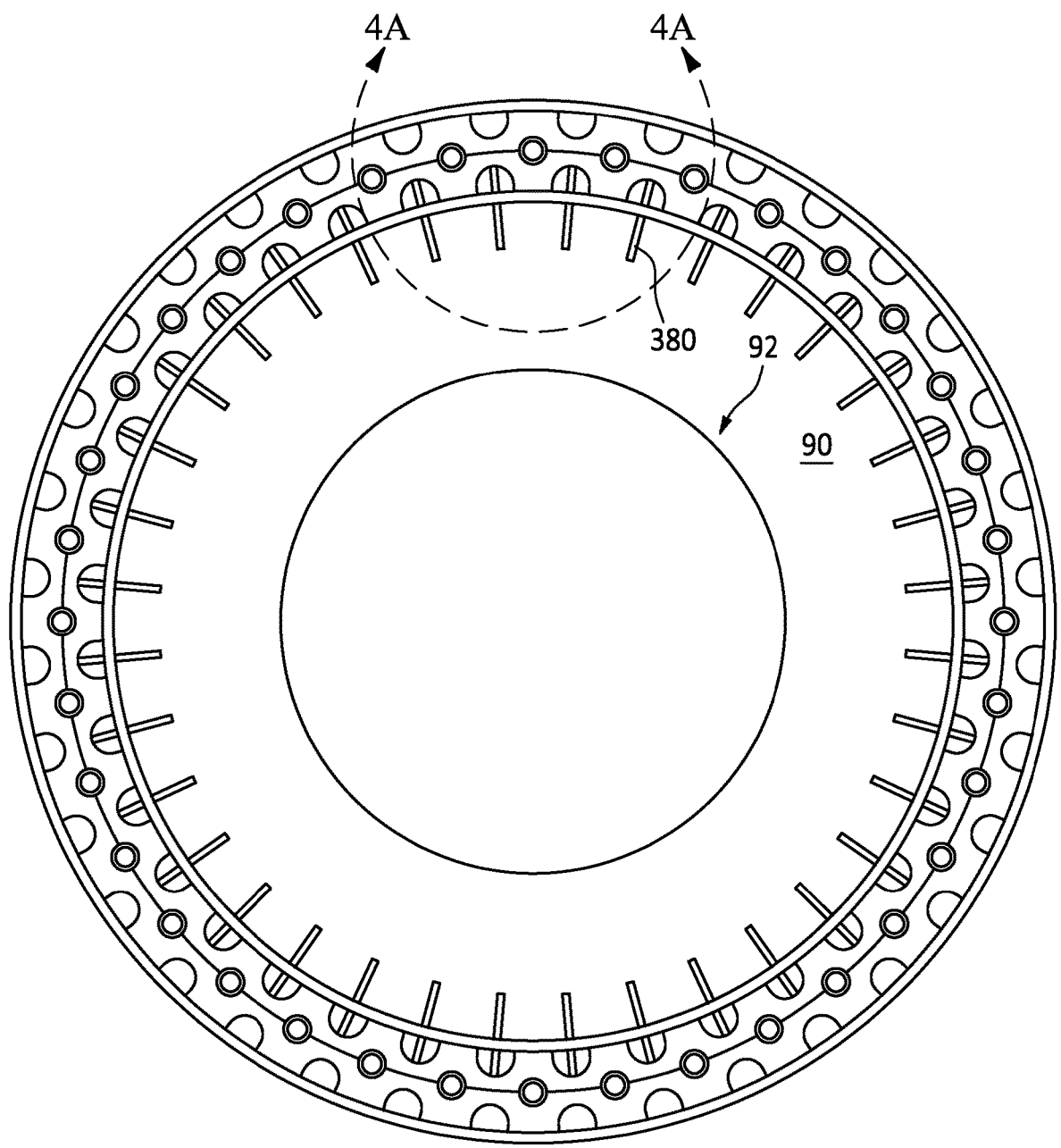
FIG. 4 is a partially schematic transverse sectional view of the heat exchanger illustrated in FIG. 2.
Figure 4A:
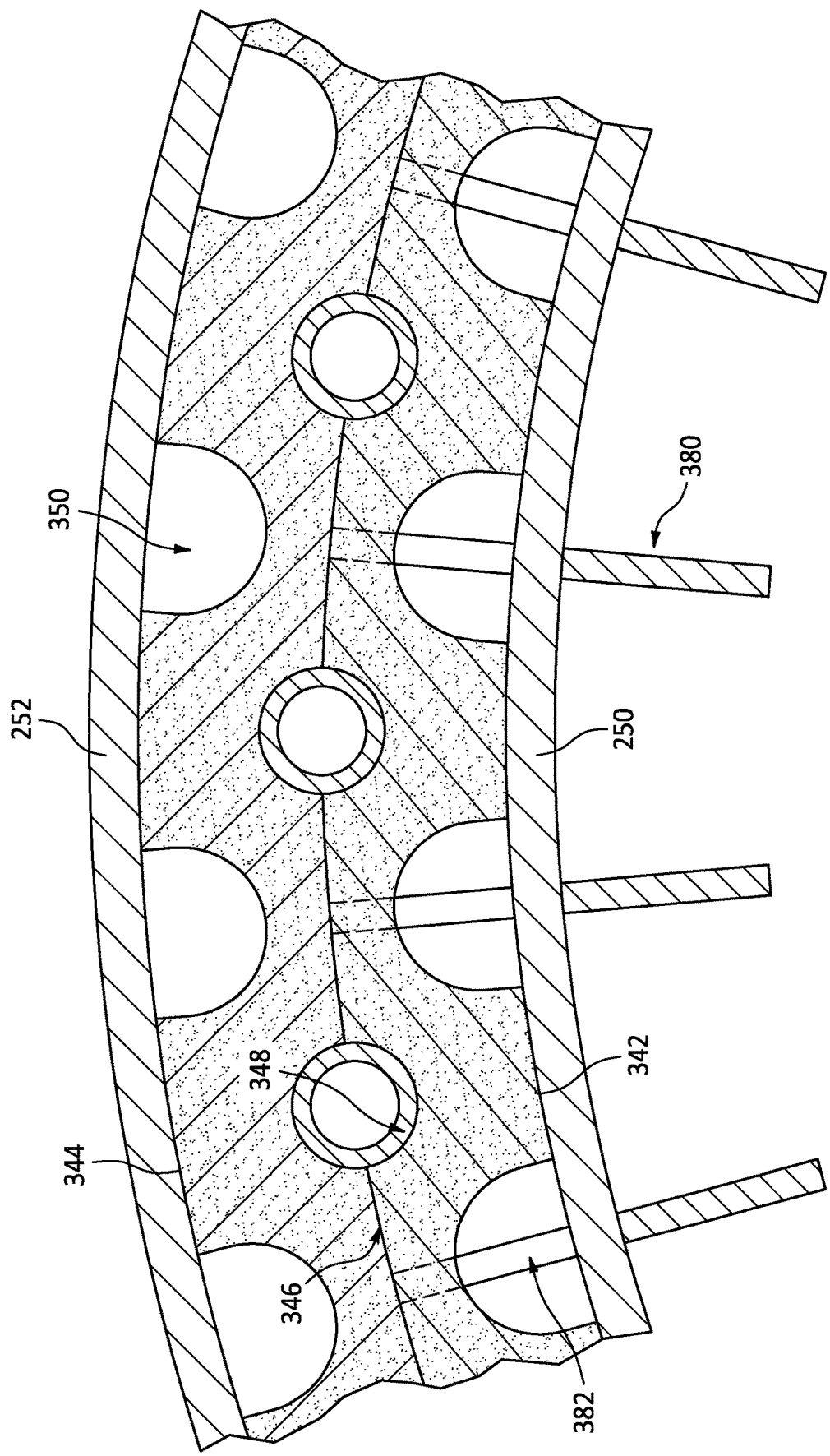
FIG. 4A is an enlarged view of a portion of the heat exchanger of FIG. 4.
Figure 5:
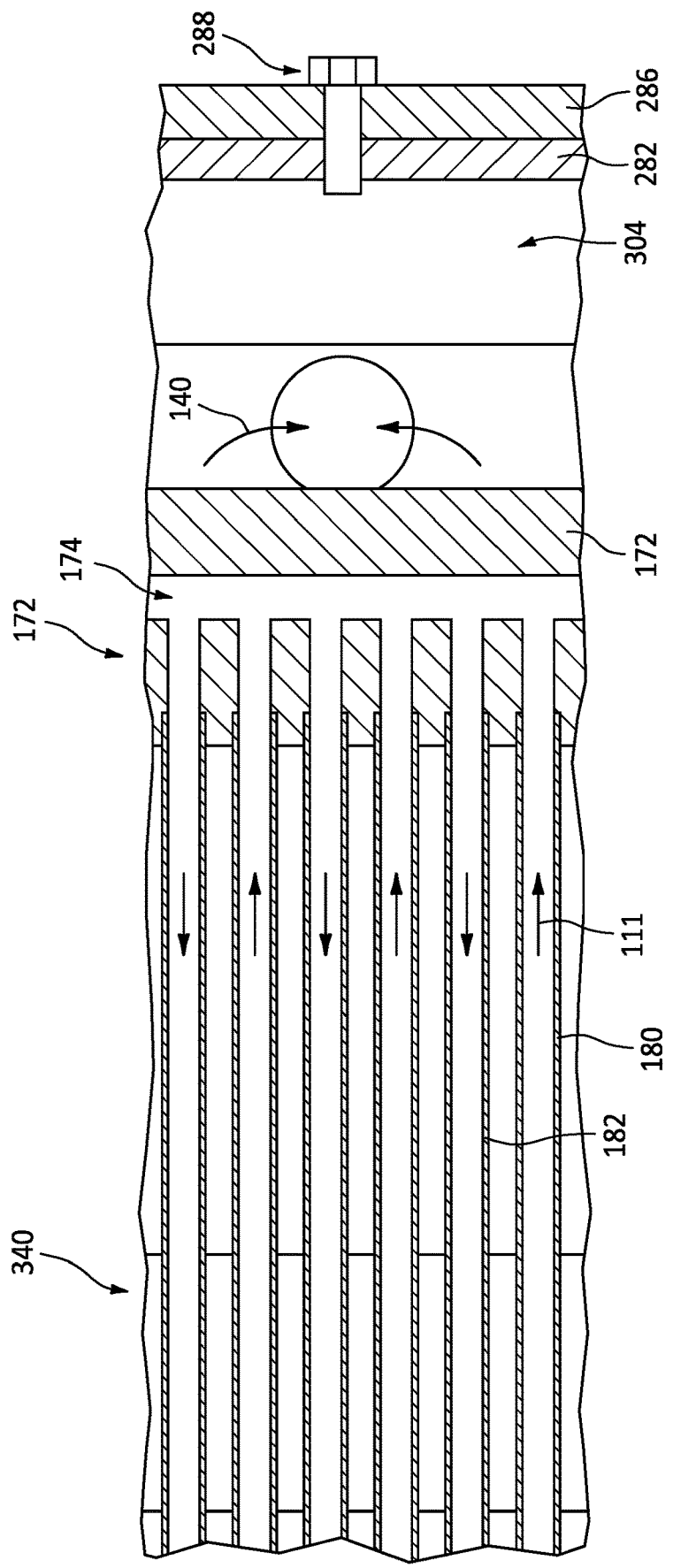
FIG. 5 is a flattened schematic partial cutaway outward radial view of tubes of the heat exchanger of FIG. 2.

In the context of an example generally annular gaspath having an inner wall/boundary (e.g., an outer wall of a centerbody 92 (FIG. 4) and an outer wall/boundary, the example heat exchanger 102 has an inner wall 250 (FIG. 2) locally forming the outer boundary of the gaspath. An alternative such gaspath may be simply non-annular circular in transverse section (e.g., lacking a centerbody). The heat exchanger also has an outer wall 252. The chamber 142 is thus configured radially between the inner wall and the outer wall. In the example engine, the chamber 142 may be full annulus or may be a segment of an annulus. For example, there may be a circumferentially-arrayed plurality of heat exchanger segments fluidically in parallel along the fuel flowpath or on separate branches of the fuel flowpath. Such segmentation may allow for ease of assembly and manufacture and for independent operation. For example, one aspect of independent operation allows shut-off of fuel through an individual segment responsive to a leak or other problem with that segment. An example number of segments is two (e.g., each 1800 or slightly less) to twelve (e.g., each 300 or slightly less).

As noted above a sectorized heat exchanger may offer similar construction/assembly benefits to a segmented one where separate chambers are formed in separate segments. The example sectorized heat exchanger has a full annulus chamber 142. The outer wall 250 may be single-piece or segmented such as by bolting at axially-extending, radially-protruding flanges (not shown). Similarly, the inner wall 252 may be single-piece or segmented such as by bolting at axially-extending, radially-protruding flanges (not shown). Separate groups of tubes 180, 182 and their associated manifolds and plenums may occupy separate sectors of the full annulus chamber. An example number of such groups and sectors is two to twelve as with the segments noted above.

Depending upon implementation, the heat exchanger may form a principal structural component of the engine or may be ancillary. For example, the example heat exchanger is shown mounted between a turbine exhaust case (TEC) 260 (FIG. 2) and a nozzle 262. If implemented as a structural heat exchanger, the heat exchanger 102 provides the structural mechanical mounting coupling the nozzle to the TEC to maintain their relative position. Alternatively, there may be separate structure (e.g., axial struts) with the heat exchanger mounted to such structure and not adding substantial strength to the connection between TEC and nozzle. Additionally, there may be radial struts supporting the heat exchanger 102 relative to the engine centerbody along the inner boundary of the gaspath. In yet further variations, radial struts may extend through the chamber 142 to transfer loads and/or prevent ballooning of the chamber under pressure. To accommodate such radial struts, there may be non-uniform spacing between some adjacent tubes.

In the illustrated example, the heat exchanger inner wall 250 (FIG. 2A), forward/upstream end wall 280, and aft/downstream end wall 282 (FIG. 2C) are part of a single structural metallic piece or assembly formed of a robust high temperature alloy (e.g., a nickel-based superalloy) such as IN-718. At least along the gaspath-facing inner diameter (ID) surface of the inner wall 250, the alloy may be a substrate coated with a thermal and/or environmental barrier coating (TBC/EBC) such as a sprayed or vapor-deposited ceramic (e.g., a yttria-stabilized zirconia (YSZ) and/or gadolinia-stabilized zirconia (GSZ or GZO)) optionally with an underlying bondcoat.

The metallic piece may be formed by casting, additive manufacturing, or fabrication. The forward and aft walls 280 and 282 may serve as respective mounting flanges mounted to adjacent flanges 284 and 286 of the TEC and nozzle, respectively (e.g., via fasteners such as bolts 288). In the illustrated example, the heat transfer fluid flow 140 and flowpath enter and exit the chamber at ports in the outer wall. In alternative implementations, the heat transfer fluid may pass through the flanges (e.g., via appropriate plumbing fittings such as in FIG. 3).

As noted above, fuel temperature may be controlled (e.g., by controller 101 of FIG. 1) via controlling the flow rate of heat transfer fluid. In one group of examples, the heat transfer fluid will tend to lose heat in regions of the heat transfer fluid flowpath 150 (and its loop 152) away from the heat exchanger. In some implementations, this may merely be via exposure of simple conduit/piping to external or other internal engine conditions. In other implementations, there may be specific heat transfer means such as an additional heat exchanger (not shown) discharging heat from the heat transfer fluid to air (e.g., bypass air).

The flow rate of heat transfer fluid will inversely correlate with the heat transferred to the fuel and thus to the fuel outlet temperature measured by fuel temperature sensor 144. At no or low heat transfer fluid flow rate, there will be a substantial temperature gradient along the heat transfer fluid flowpath between the heat exchanger 102 and remote regions of the heat transfer fluid flowpath 150 (and its loop 152). At increased flow rates, there will be less gradient and more heat discharged away from the heat exchanger.

In a simple control example, there is a closed loop feedback control of measured fuel outlet temperature (measured by sensor 144) via heat transfer fluid flow rate (or corresponding parameters such as heat transfer fluid pump motor current). The feedback control may be to a specific single fuel outlet temperature or to a range. If fuel outlet temperature exceeds the single value or the range upper limit, then the controller 101 (FIG. 1) increases the heat transfer fluid flow rate (or corresponding parameter) such as via a predetermined increment (e.g., in pump 200 speed or current). Similarly, if the measured fuel outlet temperature falls below the single value or range lower limit, the controller may decrease the heat transfer fluid flow rate (e.g., by decrementing directly or via the associated parameter). In sectorized or segmented systems, such control may be segment-by-segment.

The example accumulator 210A or 210B is purely passively pressure actuated (e.g., as opposed to having a controlled valves and/or pressurizing pumps or compressors). As discussed above, the accumulator has a range of conditions between a condition where the pressurant gas 220 is maximally expanded (e.g., a bladder is maximally expanded or a piston is at the end of its stroke near the port to the loop); and a condition where the pressurant is maximally compressed.

Table I below shows hypothetical parameters for a number of conditions for the example accumulator and heat transfer loop inlet to the heat exchanger. The example pressures may be relatively low compared with the supercritical range discussed above. The example volumes of the accumulator and amount of gas are chosen so that, in a shutdown/cooled down condition, the piston or bladder is in an intermediate condition. Thus, there is pressure equalization across the piston or bladder. For the bladder-type accumulator 210B, the poppet valve 234 is open. Thus, there is pressure equalization between the volume 230 and the port 228 (and thus adjacent section of the branch from/to the heat transfer loop).

In an example idle condition, due to heating of the fuel, heat transfer loop pressure has increased and thus vented into the accumulator, shifting the piston or bladder to a more compressed condition while pressure is still equalized. At an example take-off condition, the temperature is less so that the equalized pressure is lower but still above the shutdown condition pressure.

A leak from the heat transfer fluid loop or the chamber 142 to atmosphere will be detected via the sensor 202 as a drop in pressure. In response, the control system may shut off the fuel pumps and close the fuel valves as described above. However, the pressure may continue to drop because the leak has not been isolated. With continued pressure drop, eventually, the accumulator will reach its maximally expanded condition, after which the accumulator pressure may remain essentially constant/unaffected (e.g., other than by temperature) (Table I shows this as an example 500 psi) as the heat transfer loop pressure may drop to ambient.

In the event of a leak in one of the fuel tubes, high pressure heat transfer fluid may flow through the leak into the tube. As noted above, this may be evidenced by a drop in heat transfer loop pressure measured by the pressure sensor 202 causing shutdown. The heat transfer loop pressure may stabilize at a level that depends on the nature of the nature of the shut-down of fuel flow. The nature of shutdown may depend on robustness of fuel conduits. For example, if the fuel conduit(s) between the valves 130 and 136 have a particular pressure rating, the valve 136 may be kept open until the pressure measured by sensor 202 drops to that rating and may be opened if the pressure again exceeds that rating.

TABLE I

| | Accumulator | | HT Loop Inlet | |
|---|---|---|---|---|
| Condition | Pressure (psi (kPa)) | Temp. (° F. (° C.)) | Pressure (psi (kPa)) | Temp. (° F. (° C.)) |
| Shut down | 600 (4137) | 70 (21) | 600 (4137) | 70 (21) |
| Idle | 700 (4826) | 200 (93) | 700 (4826) | 450 (232) |
| Takeoff | 650 (4482) | 200 (93) | 650 (4482) | 400 (204) |
| HT leak | 500 (3447) | 70 (21) | ambient | N/A |
| Fuel leak | 600 (4137) | 70 (21) | * | * |

*More dependent on operating condition, nature of any modularity/independence, and the like than the other values illustrated in the table.

The heat exchanger 102 is subject to a radial thermal gradient with the inner wall at much higher temperature than the outer wall. This potentially can cause differential thermal expansion of the inner wall 250 relative to the outer wall 252 (if all other factors are equal). To compensate for such potential differential thermal expansion, any of several mechanisms may be provided.

One group of compensation mechanisms or means involve differences in materials between inner wall 250 and outer wall 252 wherein the materials have different coefficients of thermal expansion (CTE). A lower CTE of the inner wall relative to the CTE of the outer wall will reduce differential thermal expansion compared with materials of the same CTE. For example, in the illustrated example heat exchanger, the outer wall or a section thereof may be formed of stainless steel which has a higher CTE than the nickel-base superalloy of the inner wall or portion thereof. Such higher CTE material may form an example at least 50% of the length of the heat exchanger.

Even when such means are present, they may be imperfect due to transient behavior when one of the inner wall and outer wall heats or cools faster than the other between steady-state conditions. Thus, additionally or alternatively, the differential thermal expansion may be accommodated by mechanisms or means such as a sliding sealed interaction or a compliant section.

In the seal example, the seal may be axially captured relative to one component and axially sliding relative to the other. In the illustrated example, an annular (or annular segment) seal 300 (FIG. 2C) is captured in a radially outwardly open channel 302 of the aft wall 282/flange 304 integral with the inner wall. Thus, in the illustrated example, an axial flange 304 extends forward from a radial flange portion of the aft wall 282. The seal 300 is in sliding engagement with an inner diameter (ID) surface portion of the outer wall 252. Example seals 300 are carbon seals (e.g., electro-graphitic carbon (EGC)). In various implementations, such a seal may be spring biased (not shown) into engagement with the mating surface of the outer wall.

Figure 2B:
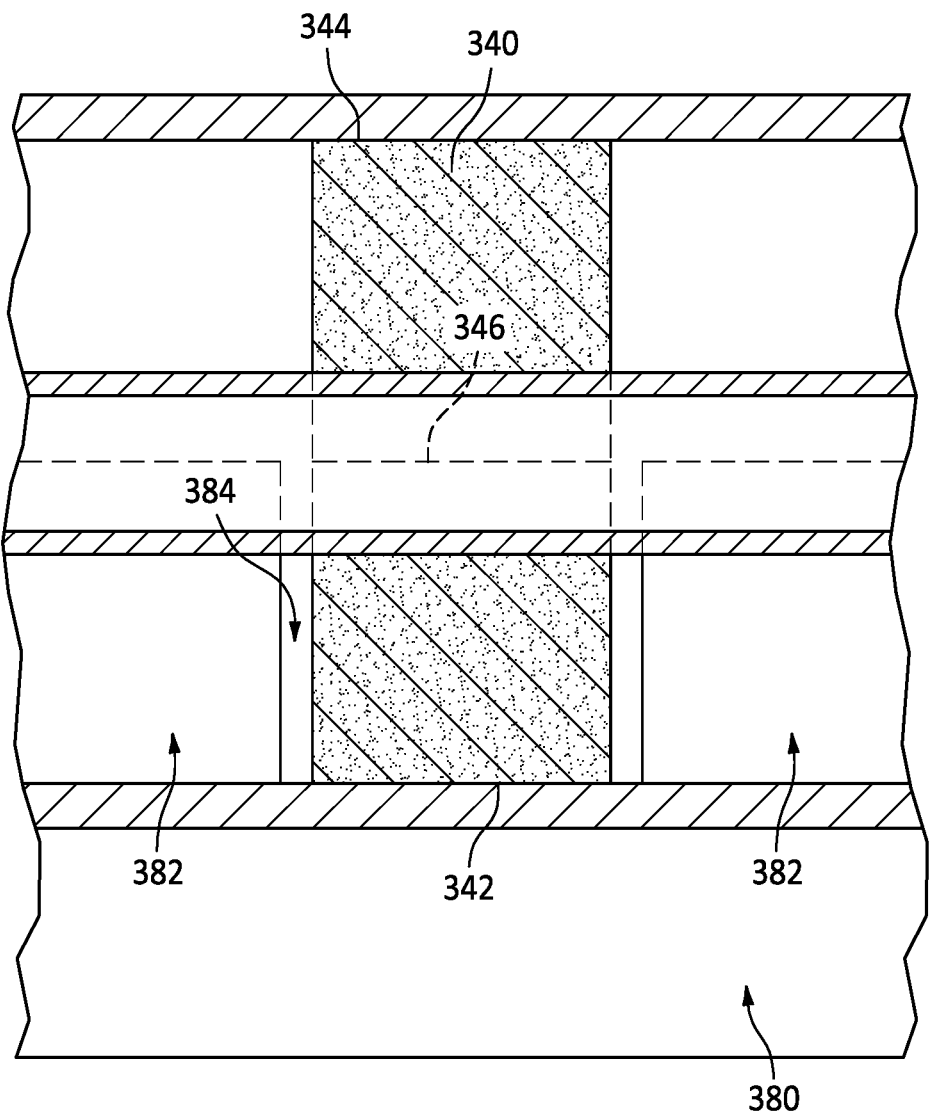
FIG. 2B is an enlarged view of a central portion of the heat exchanger illustrated in FIG. 2.
Figure 3:
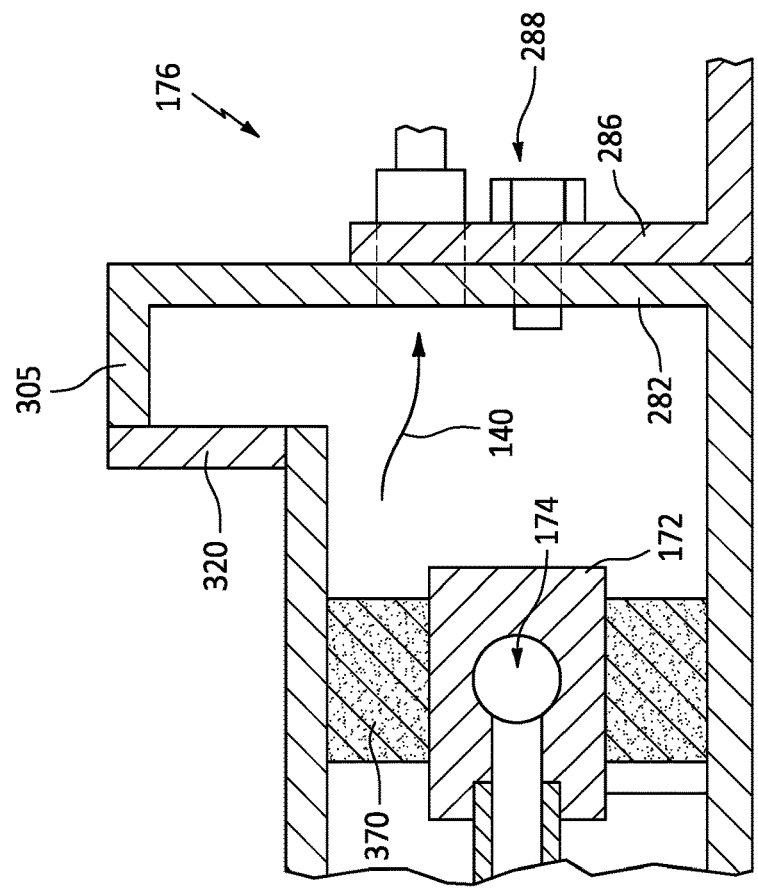
FIG. 3 is an enlarged central longitudinal sectional view of an alternate aft portion of the heat exchanger illustrated in FIG. 2.
Figure 2C:
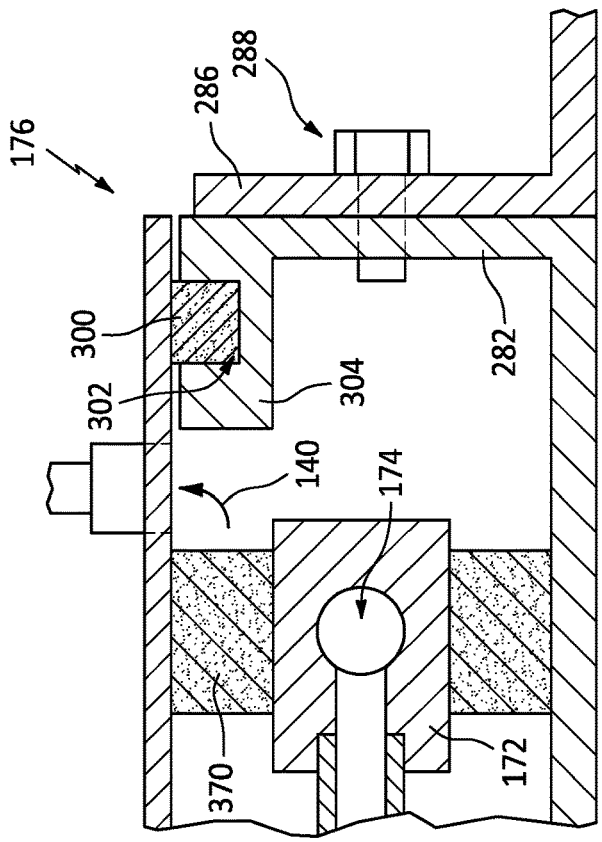
FIG. 2C is an enlarged of an aft portion of the heat exchanger illustrated in FIG. 2.

FIG. 3 shows a compliant means in the form of a single annular (or annular segment) diaphragm 320 extending radially between the outer wall and the axial flange 305 (spaced radially outward of the FIG. 2C axial flange 304 by having the end wall/flange 282 extend further radially outward). Given the mounting function of the aft wall/flange, the aft wall/flange may protrude radially outward beyond the outer wall so that the diaphragm extends radially inward to the outer wall. The diaphragm may be formed of a relatively thin (compared to the flange) metallic element such as stainless steel or nickel-based superalloy. The diaphragm may be secured via fasteners (e.g., bolts—not shown) to the outer wall and the aft wall/flange or may be welded or brazed, particularly when formed of a compatible material to one of the two.

Although a single annular (or annular segment) diaphragm is shown in FIG. 3, alternatives involve bellows cross-sections. Similarly, although the illustrated diaphragm is at one axial end, alternatives may involve rigid couplings at the axial ends and a diaphragm or bellows section at an intermediate location along the outer wall.

In a situation such as a full annulus chamber and outer wall (whether single-piece or segmented outer wall) the sliding seal may exist only at one end and the bellows may exist only at a single axial location and no other sliding seal may be needed. However, in the case of fully segmented heat exchangers wherein there are separate isolated chambers or sub-chambers for the heat transfer fluid, differential thermal expansion at circumferential ends of the segment may also be relevant.

In one example (not shown) of a fully-segmented heat exchanger, there may be somewhat similar axially-extending seals to the circumferentially-extending seals described above but along flanges at the outer diameter extremes of the circumferential end walls. In such a situation, the relative sliding motion due to differential thermal expansion will be principally axial (parallel to the elongate direction of the seal rather than transverse).

An additional thermal expansion consideration involves axial thermal expansion of the tubes relative to one or both of the inner wall and outer wall. In the example heat exchanger, the combined manifold, inner wall, and outer wall may be essentially relatively immovably secured to each other such as via bolting, welding, and the like. The return manifold may have indirect movable connection to the inner wall and the outer wall.

To maintain tube radial and circumferential position while permitting the axial movement, wear/guide blocks may be positioned at one or more axial locations. In the illustrated example, there are two axial stages of wear blocks (e.g., carbon blocks). An upstream wear block stage 340 (FIG. 2B) engages intermediate portions of the tubes and has an inner diameter (ID) surface 342 engaging the outer diameter (OD) surface of the inner wall 250 and an outer diameter (OD) surface 344 engaging the inner diameter (ID) surface of the outer wall 252.

The example upstream wear block stage 340 comprises an inner piece and an outer piece (FIG. 4) meeting at a junction 346 and sandwiching the tubes between the pieces with the tubes being accommodated in grooves 348 in the mating surfaces. The pieces also include grooves 350 (or holes) for passing the heat transfer fluid as portions of the heat transfer fluid flowpath 150. Depending upon implementation, the wear block stage 340 may be in sliding relation with all three of the inner wall, tubes, and outer wall or may be rigidly secured to one or captured by of those three. For example, they may be captured by the walls (e.g., protrusions from the walls on opposite axial sides of the blocks or protrusions captured in recesses in the blocks).

The example downstream second wear block stage 370 (FIG. 2C) is mounted to the return manifold and may comprise a separate inner ring and outer ring. This may be secured to the return manifold 172 via fasteners (not shown) or simply via mechanical interfitting of projections from one element being received in compartments or recesses of another element.

For further enhancing heat transfer from the combustion gas to the heat transfer fluid, the example heat exchanger includes a first plurality of fins 380 (FIG. 4) (first fins or inner diameter (ID) fins) protruding into the gaspath 90 and a second plurality of fins 382 (second fins or outer diameter (OD) fins) protruding into the heat transfer fluid. The first fins 380 protrude from the inner wall 250 ID surface of the heat exchanger and may be unitarily formed with the inner wall (e.g., via casting as a unit or additively manufacturing) or be separately formed and mounted thereto (e.g., by welding). Similarly, the second fins 382 may protrude from the OD surface of the inner wall 250. In the illustrated embodiment, each first fin is circumferentially in registry with an associated second fin. Such a configuration may be particularly useful if it is desired that each first fin and the associated second fin be formed as a single piece and mounted to the inner wall such as via a slot in the inner wall substrate (followed by welding or brazing to seal and secure). Or, even if separate pieces, the alignment may improve heat transfer and may improve manufacture via allowing co-welding or co-brazing.

In the illustrated example heat exchanger, the second fins 382 are interdigitated with the tubes with each second fin 382 protruding radially between two tubes (or, for terminal tubes in a sector only circumferentially outboard of that terminal tube). This protrusion may cause the second fins to radially extend at least as far out as the inner diameter boundary of the adjacent tubes and, more preferably, at least radially past the centerlines of the adjacent tubes.

Various means may be provided to accommodate the wear blocks to the fins and/or vice-versa. For example, the second fins may be segmented, interrupted along the length of the heat exchanger to provide gaps 384 (FIG. 2B) accommodating the wear blocks. Or, the wear blocks may be grooved to accommodate the fins.

Figure 6:
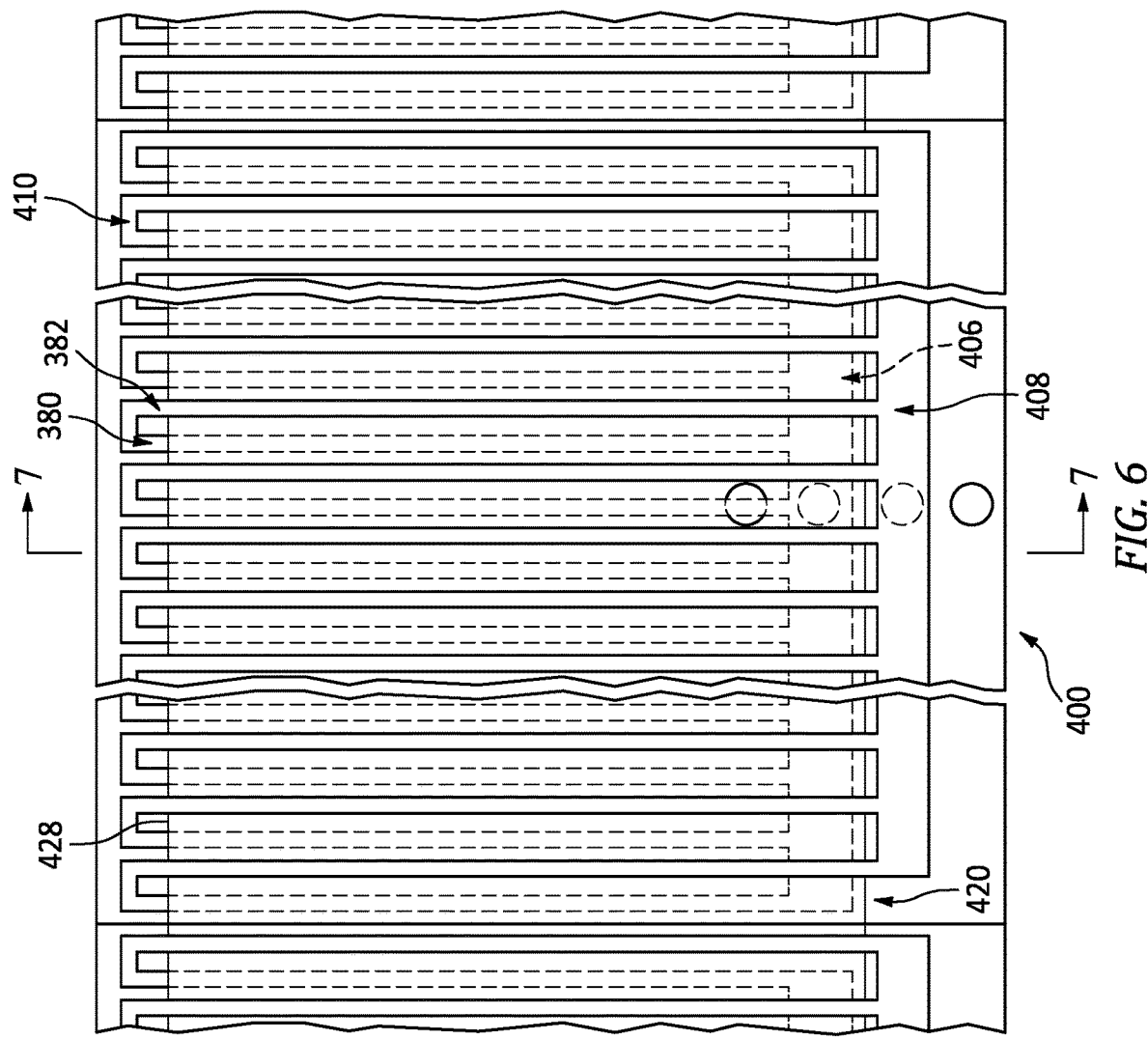
FIG. 6 is a schematic planform view of an alternate heat exchanger.
Figure 7:
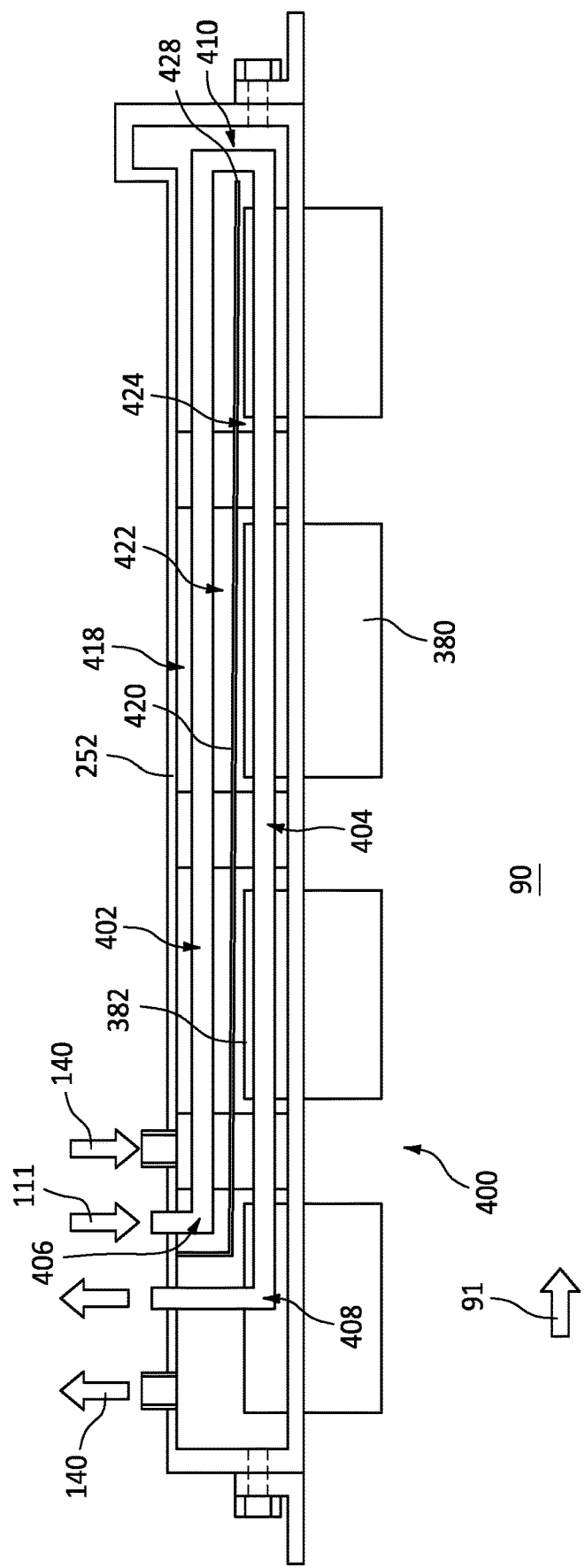
FIG. 7 is a schematic axial sectional view of the heat exchanger of FIG. 6, taken along line 7-7 of FIG. 6.

FIGS. 6 and 7 show an alternate heat exchanger 400 that, except for differences discussed, may be of similar configuration, manufacture, and use to those described above. The heat exchanger 400 provides one example of two stages (groups) of fuel tube legs or segments offset from the gaspath normal to the direction of heat transfer from the gaspath (offset in the radial direction in the annular example). The example heat exchanger 400 is schematically shown as having tube banks 401 sectors positioned end-to-end in close facing or contacting relation in an annular chamber 418. The outer wall is shown segmented with inter-segment boundaries 412 (e.g., at mating axially-extending and radially protruding bolting flanges (not shown)).

The example heat exchanger is schematically shown flattened. Although it may represent an actual flat heat exchanger such as might be used in non-annular ducts, it may alternatively be arcuate. FIG. 6 is simplified in not showing various material thicknesses and details including the wear/guide blocks (schematically shown in FIG. 7).

The example heat exchanger 400 radially spaces the two axial legs/segments. The outboard (away from the gaspath)/upstream (along the fuel flowpath) segments 402 proceed aftward from the inlet manifold 406 and plenum to an aft turn 410. The inboard/downstream segments 404 pass forward from the aft turn to the outlet manifold 408 and plenum. The aft turn 410 may take the form of an individual turn connecting an individual associated upstream leg to an individual associated downstream leg. Alternatively, the aft turn may take the form of a plenum/manifold common to multiple legs 402, 404 of each stage.

With the example radial stagger of the legs, to provide generally counterflow heat exchange between the heat exchange fluid and the fuel, the chamber 418 (FIG. 7) is divided by a wall (divider) 420 between the inboard segments and the outboard segments forming an outboard section 422 of the chamber and an inboard section 424 of the chamber. The heat exchange fluid inlet is relatively forward on the outboard section and the heat exchange fluid outlet is relatively forward on the inboard section. Thus, the heat exchange fluid flowpath is generally aftward in the outboard section 422 and forward in the inboard section 424, turning at an aft edge 428 of the divider.

In the example, the outboard legs 402 are circumferentially staggered relative to the inboard legs 404 (e.g., the two groups are exactly out of phase circumferentially). This may be particularly useful where a single bent tube forms an outboard leg, an inboard leg and the joining turn to allow a greater radius of curvature at the turn for a given radial offset. This also may expose the outboard stage to slightly greater heat transfer.

The example divider 420 may be secured at its forward end. The securing may be directly to the body of the heat exchanger (e.g., shown secured to the outer wall 252). This may be via welding, brazing, or the like. Alternative securing may be to one or both of the fuel manifolds 406, 408. Additionally, the divider may be retained radially such as via the wear/guide blocks. In this situation, there may be wear/guide blocks guiding the outboard tube legs and wear/guide blocks guiding the inboard tube legs. For example, at each axial position, the block stages may be formed by a pair of outboard pieces and a pair of inboard pieces such as those pairs shown for the FIG. 4 embodiment of a single tube stage. One aspect of the divider implementation is that such blocks may be mounted to the divider (e.g., via threaded fasteners or projections of divider received in recesses of the blocks (or vice-versa)). In such a situation of mounting the blocks to the divider, the blocks may freely slide relative to their respective associated tubes and associated inboard wall or outboard wall.

In the illustrated FIG. 7 example, the fins 382 interdigitate with the inboard stage of tube legs. Also, in this example, both the first fins 380 and the second fins 382 are segmented.

Further variations may have the inner wear blocks (engaging the tube legs 404) and the outer wear blocks (engaging the tube legs 402) axially offset from each other. Additionally, they be of unequal number (e.g., FIG. 7 shows an orphan outer block stage near the aft end).

Further variations may have other manifold/plenum configurations. For example, the fuel tubes may penetrate the outer wall to connect to an external inlet or outlet manifold. Similarly, there may be an external inlet or outlet manifold for heat transfer fluid to better circumferentially distribute through a circumferential array of ports.

Further variations may have other than axially-extending tube legs. For example, the tube legs may extend transverse to the engine centerline and/or downstream gaspath direction. Such transverse orientation may be circumferential in the case of an annular (whether full annular or segmented annular or other) heat exchanger. Yet alternative configurations may involve spiral tubes (spiraling radially) or helical tubes or combinations thereof as in a frustoconical helix/spiral.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units. Except where explicitly or implicitly described otherwise, all pressures are absolute rather than gage.

One or more embodiments have been described. Nevertheless, it will be understood that various modifications may be made. For example, when applied to an existing baseline configuration, details of such baseline may influence details of particular implementations. Particular fuels may influence particular implementations. Additionally, as noted above, available duct space and duct geometry may influence implementations. Certain engines and their associated aircraft include ducts of cross-sections other than circular downstream of the turbine. In such an engine, the heat exchanger may be flattened or otherwise changed to correspond to such existing duct geometry. Accordingly, other embodiments are within the scope of the following claims.

What is claimed is:

1. A turbine engine comprising:
a compressor;
a combustor;
a turbine;
a gaspath passing downstream from the compressor through the combustor and then through the turbine;
a fuel source;
a fuel flowpath from the fuel source to the combustor; and
a heat exchanger for transferring heat from the gaspath to the fuel flowpath,
wherein the heat exchanger comprises:
an inner wall in heat transfer relation with the gaspath;
an outer wall;
tubes between the inner wall and the outer wall bounding respective segments of the fuel flowpath; and
a heat transfer fluid between the inner wall and the outer wall and in heat transfer relation with the tubes and the inner wall
wherein the turbine engine further comprises:
a heat transfer fluid flowpath for the heat transfer fluid passing downstream through the heat exchanger and being a recirculating flowpath;
a pump along the heat transfer fluid flowpath for pumping the heat transfer fluid; and
a pressure sensor along the heat transfer fluid flowpath.

2. The turbine engine of claim 1 wherein:
the fuel comprises at least 90% hydrogen by weight; and
the heat transfer fluid comprises at least 90% nitrogen by weight.

3. The turbine engine of claim 1, further comprising:
an accumulator vessel; and
a branch off the heat transfer fluid flowpath, the branch extending to the accumulator vessel.

4. The turbine engine of claim 1 wherein:
the heat exchanger comprises a plurality of sectors; and
the turbine engine includes:
means for independently controlling flow of the fuel through each of the sectors; and/or
means for independently controlling flow of the heat transfer fluid through each of the sectors.

5. The turbine engine of claim 1 wherein the heat exchanger has:
a first axial end mated to a turbine exhaust case; and
a second axial end mated to a nozzle.

6. The turbine engine of claim 1 wherein:
the inner wall comprises a nickel-based alloy; and
the outer wall comprises stainless steel.

7. The turbine engine of claim 1 wherein the heat exchanger comprises:
a fuel inlet manifold;
a fuel outlet manifold; and
said tubes bounding respective segments of the fuel flowpath between the fuel inlet manifold and the fuel outlet manifold.

8. The turbine engine of claim 7 wherein the heat exchanger inner wall comprises:
a first plurality of fins protruding into the gaspath; and
a second plurality of fins protruding into the heat transfer fluid.

9. The turbine engine of claim 7 wherein the heat exchanger comprises:
means for accommodating differential thermal expansion of the inner wall relative to the outer wall.

10. The turbine engine of claim 9 wherein:
the inlet manifold, the outlet manifold, the inner wall, and the outer wall are secured to each other near a first axial end of the heat exchanger with the tubes extending toward an opposite second axial end.

11. The turbine engine of claim 9 wherein the means for accommodating differential thermal expansion of the inner wall relative to the outer wall comprises:
a diaphragm on the outer wall.

12. The turbine engine of claim 9 wherein the means for accommodating differential thermal expansion of the inner wall relative to the outer wall comprises:
a sliding seal.

13. The turbine engine of claim 7 wherein the heat exchanger comprises:
means for accommodating differential thermal expansion of the inner wall relative to the tubes.

14. The turbine engine of claim 13 wherein the means for accommodating differential thermal expansion of the inner wall relative to the tubes comprises:
a plurality of carbon blocks in sliding engagement with at least one of the inner wall and the tubes.

15. A method for operating the turbine engine of claim 1, the method comprising:
passing fuel along the fuel flowpath from the fuel source to the combustor;
combusting the passed fuel in the combustor to generate combustion gas; and
transferring heat from the combustion gas to the fuel via the heat transfer fluid prior to the passing of the fuel to the combustor to heat the fuel.

16. The method of claim 15 further comprising:
measuring a pressure of the heat transfer fluid; and
responsive to a decrease in the measured pressure of the heat transfer fluid, shutting down the turbine engine and/or shutting off at least portion of the passing fuel.

17. The method of claim 15 further comprising:
responsive to an increase in pressure of the heat transfer fluid, venting heat transfer fluid to an accumulator.

18. The method of claim 15 wherein:
the passed fuel enters the heat exchanger at:
a temperature of −260° C. to −230° C.; and
the method further comprises:
measuring a temperature of the fuel; and
responsive to the measured temperature of the fuel controlling a pump pumping the heat transfer fluid so as to maintain the passed fuel leaving the heat exchanger at:
a temperature of −90° C. to −65° C.

19. A turbine engine comprising:
a compressor;
a combustor;
a turbine;
a gaspath passing downstream for the compressor through the combustor and then through the turbine;

a fuel source;

a fuel flowpath from the fuel source to the combustor; and a heat transfer fluid flowpath carrying heat transfer fluid for transferring heat from the gaspath to the fuel flowpath, the heat transfer fluid comprising at least 90% nitrogen by weight.

20. The turbine engine of claim 19 wherein:

the fuel comprises at least 90% hydrogen by weight.

21. The turbine engine of claim 19 wherein the heat exchanger further comprises:

means for accommodating differential thermal expansion of the inner wall relative to the outer wall.

22. The turbine engine of claim 19 wherein:

an accumulator vessel; and a branch off the heat transfer fluid flowpath, the branch extending to the accumulator vessel.

23. A turbine engine comprising:

a compressor;

a combustor;

a turbine;

a gaspath passing downstream from the compressor through the combustor and then through the turbine;

a fuel source;

a fuel flowpath from the fuel source to the combustor; and a heat exchanger for transferring heat from the gaspath to the fuel flowpath, wherein the heat exchanger comprises:

an inner wall in heat transfer relation with the gaspath;

an outer wall;

tubes between the inner wall and the outer wall bounding respective segments of the fuel flowpath;

a heat transfer fluid between the inner wall and the outer wall and in heat transfer relation with the tubes and the inner wall; and means for accommodating differential thermal expansion of the inner wall relative to the tubes.

24. The turbine engine of claim 23 wherein the means for accommodating differential thermal expansion of the inner wall relative to the tubes comprises:

a plurality of carbon blocks in sliding engagement with at least one of the inner wall and the tubes.

* * * * *